(12) United States Patent
Moore (10) Patent No.: US 8,805,553 B2
(45) Date of Patent: Aug. 12, 2014

(54) METHOD FOR DYNAMICALLY CONTROLLING A MANUFACTURING PROCESS USING PRODUCT OVER-DELIVERY

(75) Inventor: Alexander James Moore, De Pere, WI (US)

(73) Assignee: Schreiber Foods, Inc., Green Bay, WI (US)

( * ) Notice: Subject to any disclaimer, the term of this patent is extended or adjusted under 35 U.S.C. 154(b) by 545 days.

(21) Appl. No.: 12/756,595

(22) Filed: Apr. 8, 2010

(65) Prior Publication Data

US 2011/0251709 A1    Oct. 13, 2011

(51) Int. Cl.
*G05B 13/02* (2006.01)

(52) U.S. Cl.
CPC .................... *G05B 13/0255* (2013.01)
USPC .............. 700/33; 700/281; 700/303; 700/305

(58) Field of Classification Search
USPC ......... 700/19, 28, 33, 45, 103, 281, 283, 303, 700/305, 306
See application file for complete search history.

(56) References Cited

U.S. PATENT DOCUMENTS

| | | | |
|---|---|---|---|
| 3,727,504 A * | 4/1973 | Osterholt | 83/483 |
| 3,966,973 A | 6/1976 | Henry et al. | |
| 4,557,019 A * | 12/1985 | Van Devanter et al. | 452/157 |
| 4,661,917 A | 4/1987 | Haze et al. | |
| 5,079,014 A | 1/1992 | Morikawa et al. | |
| 5,209,939 A | 5/1993 | Kempf | |
| 5,303,639 A * | 4/1994 | Bunn et al. | 99/289 R |
| 5,773,060 A | 6/1998 | Smith | |
| 6,164,174 A | 12/2000 | Sigurdsson et al. | |
| 6,213,174 B1 * | 4/2001 | Cook et al. | 141/83 |
| 6,298,470 B1 * | 10/2001 | Breiner et al. | 700/109 |
| 6,443,828 B1 * | 9/2002 | Melville | 452/157 |
| 6,558,720 B1 | 5/2003 | Karner | |
| 6,629,493 B1 * | 10/2003 | Schaible et al. | 99/352 |
| 6,797,306 B2 * | 9/2004 | Fahs et al. | 426/512 |
| 6,800,313 B2 | 10/2004 | Hayashi et al. | |
| 6,922,652 B2 | 7/2005 | Edwards et al. | |
| 7,029,715 B2 | 4/2006 | McCall et al. | |
| 7,154,055 B2 | 12/2006 | Hebenstreit | |
| 7,489,980 B2 * | 2/2009 | Behm et al. | 700/96 |
| 7,577,498 B2 * | 8/2009 | Jennings et al. | 700/245 |
| 2008/0274240 A1 | 11/2008 | Germouni et al. | |

* cited by examiner

*Primary Examiner* — Carlos Ortiz Rodriguez
(74) *Attorney, Agent, or Firm* — Brinks Gilson & Lione (57) ABSTRACT

A method for dynamically controlling the output of a computerized manufacturing process includes storing a product target parameter in a computer memory of a computer system associated with the manufacturing process equipment. Control limit values for a product delivery statistic are provided and a product delivery parameter is continually monitored and values are stored in the computer memory. A unit product over-delivery amount is determined from the difference between the product delivery parameter and the product target parameter. A cumulative over-delivery amount is determined by summing the difference up to the current sequence number between monitored value for the previously-produced unit products and the product target parameter. A net difference is then determined between the unit product over-delivery target parameter and the cumulative over-delivery amount. A predetermined modifier is provided and the net difference is adjusted by the predetermined modifier to obtain a control limit adjustment, and the control limits are adjusted by the control limit adjustment.

22 Claims, 9 Drawing Sheets

METHOD FOR DYNAMICALLY CONTROLLING A MANUFACTURING PROCESS USING PRODUCT OVER-DELIVERY

TECHNICAL FIELD

The present invention relates, generally, to process control methods for manufacturing processes and, in particular, to real-time process control methods involving determination of a physical property of a unit product produced by a manufacturing process, such as a food manufacturing process, or other commodity manufacturing process including a variety of products, such as bulk solids, liquids, chemical compositions, and the like.

BACKGROUND

Typical process control methodology involves specifying control limits for a physical parameter of unit products produced by the manufacturing process. To specify control limits, a parameter, such as weight, volume, moisture content, and the like is monitored over a specified period of time. Once a sufficient amount of information is collected, statistical analysis is applied to the product parameter to determine statistical values such as the need, standard deviation, range, and the like. Once the statistical values are determined, upper and lower process control limits are specified for the product parameter.

Figure 1:
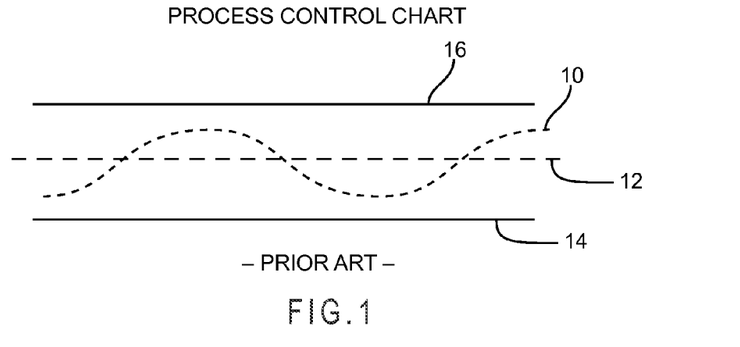
FIG. 1 shows a process control chart for a manufacturing process arranged in accordance with the prior art.

FIG. 1 shows a typical process control chart in which a product parameter, such as weight, is shown by line 10. The weight varies about a mean value denoted by the centerline 12. Based on the variation of the product weight over time, a lower process control limit 14 and an upper process control limit 16 are determined using statistical analysis. The upper and lower control limits are further adjusted based on the particular requirements of the manufactured product. For example, the buyer of the unit product may require that the product weight fall within a specified range. Other factors, such as weight requirements imposed by governmental regulations can also dictate values for the upper or lower control limit. Accordingly, the upper and lower control limits 14 and 16 can be further adjusted to trigger an alert if the unit product weight 10 goes above or below the upper or lower control limits.

In order to avoid producing unit products that fall below a specified weight, manufacturers tend to bias the process control parameters toward the upper end of the weight range. In this way, undesired low-weight products emerging from the manufacturing process are minimized. While biasing the control limits toward the upper end of the weight range can help ensure that underweight unit products will be minimized, the possibility of producing overweight unit products is increased. By producing unit products in excess of an upper weight limit, excess manufacturing costs are realized. While the buyer of the unit products can benefit from overweight products, the manufacturer often charges a sales price based on a predetermined specified weight. Accordingly, the manufacturer can suffer a monetary loss on every overweight unit product produced by the manufacturing process. In some cases, where overweight unit products are produced, the excess must be discarded in situations where the packaging of the unit products does not permit a product weight or volume beyond an upper limit. In such a situation, the excess weight of each unit products must be discarded or recycled and either represents a monetary loss or reduces the overall efficiency of the manufacturing process, or both.

Thus, there is a need for improved process control methods that increase the efficiency of the manufacturing process by reducing the amount of excess product, while maintaining a physical or chemical characteristic of the unit products within a desired control range.

SUMMARY

A method for controlling the output of a computerized manufacturing process includes storing a product target parameter in a computer memory of a computer system associated with the manufacturing process equipment. Control limit values for a product delivery statistic of the product target parameter and a unit product over-delivery target parameter are stored and, a product delivery parameter is monitored and values are continually stored in the computer memory for the product delivery parameter and a sequence number of the unit products produced. A cumulative over-delivery amount is determined and net difference between the cumulative over-delivery amount and the unit product over-delivery target parameter is determined in a processor of the computer system. A predetermined modifier is provided and the net difference is adjusted by the predetermined modifier to obtain a control limit adjustment, and the control limits are adjusted by the control limit adjustment.

In another aspect, a method for controlling output of a computerized manufacturing process includes storing a product parameter in a computer memory of the computer system associated with the manufacturing process equipment. Control limit values for a product delivery statistic of the product target parameter and a unit product over-delivery target amount are stored in the computer memory. A product delivery parameter is monitored and values are continually stored for the product delivery parameter in the computer memory. A cumulative over-delivery amount is determined in a processor of the computer system by summing the difference between the product delivery parameter and the product target parameter for a number of product units previously produced up to a current sequence number. A net difference is determined between the between the cumulative over-delivery amount and the unit product over-delivery target parameter in a processor of the computer system and a predetermined modifier is applied to adjust the net difference to obtain a control limit adjustment. The control limits are adjusted by the control limit adjustment to obtain adjusted control limits. The product delivery to a staging system within the manufacturing process is regulated so as to maintain the product delivery statistic within the adjusted control limits.

In yet another aspect, a method for controlling a manufacturing process includes determining a cumulative over-delivery amount by summing a difference between a measured parameter for a number of previously produced unit products and a target parameter. A net difference is determined between a target over-delivery amount and the cumulative over-delivery amount, and process control limits are adjusted for a product delivery statistic of the unit products based on the net difference.

DETAILED DESCRIPTION

In accordance with an aspect of the invention, a process control method is provided in which a manufacturing process will maintain a positive and constant set overfill or over-delivery amount for any given production run, or batch, while keeping a measured parameter of the unit products within specified control limits. In other aspects of the inventive method, the over-delivery concept can be applied to moisture content, density, viscosity, pH level, chemical concentration of a product component, and the like.

The concept of "overfill" or "over-delivery" generally relates to an expectation of the manufacturing process to produce unit products having a selected characteristic above or below a desired amount. As used herein, the term "overfill" or "over-delivery" can describe a general qualitative concept relating to an excess mass or volume relative to an expected or desired production level. Importantly, although the terms "overfill" or "over-delivery" can refer to an excess amount, these terms are used herein in a qualitative sense, as the inventive method also contemplates maintaining a measured product characteristic above a minimum amount or value, or below a maximum amount or value. For example, the process control methodology can be applied to controlling a manufacturing process to avoid excess moisture or to maintain a concentration of a particular chemical component above or below a specified level. The inventive method will maintain a constant under amount or over amount of the measured product characteristic depending upon the particular process requirements. Accordingly, the process control method of the invention can be used with a wide variety of manufacturing processes.

The inventive process control method operates to control a statistic of a unit process parameter, such as a running average, by continuously computing a unit product difference between a currently measured parameter from the last unit product produced by the process and a target parameter. A cumulative difference is also continuously determined by summing the difference between each unit product previously produced and the target parameter over the number of previously produced unit products. A net difference is determined between the cumulative difference and a unit product over-delivery target parameter, and this net difference is used in conjunction with a modifier value to continually adjust the process control limits for the product delivery statistic, such as a running average measurement for the unit products. Thus, the inventive process control method uses continuously-determined current difference values and historical difference values from previously-produced unit products to meet and exceed the expectations for selected product parameters in each unit product produced by the manufacturing process.

As will subsequently be described, a computerized control system is used to continuously monitor a product parameter, such as weight, volume, moisture content, and the like, and continuously adjust process control limits based upon an overfill amount measured with respect to the unit products. The control system regulates a quantity of raw materials introduced to the process based on the continuous measurement of the product parameter. In operation, the process control method requires minimal input from manufacturing personnel and reduces the overall costs associated with operating in controlling the manufacturing process.

Figure 2A:
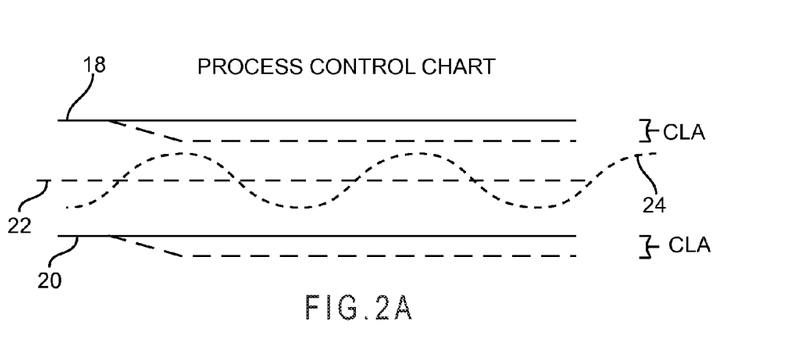
FIGS. 2A and 2B illustrate a process control charts for a manufacturing process operating with a process control method accordance with an embodiment of the invention.

Illustrated in FIG. 2A is a process control chart showing a control limit adjustment for a manufacturing process incorporating the process control method of the invention. The process control chart includes an upper control limit 18 and a lower control limit 20. A target parameter 22 is plotted between the upper and lower control limits 18 and 20. A product delivery statistic 24 is continuously monitored and varies as shown in the plot. The product delivery statistic can be one of a number of different statistics determined for unit products produced by the manufacturing process. For example, the product delivery statistic can be a running average of a product parameter calculated for a predetermined number of unit products. The physical value can be a mass or weight of a unit product or a quantity of unit products, a volume of the unit products, or a moisture content of the unit products, or the like. In accordance with the invention, any physical or chemical property of a product produced by a manufacturing process can be monitored and controlled in accordance with the invention.

In accordance with an aspect of the invention, the over-delivery amount or overfill of the unit products and the cumulative number of unit products produced (a batch) is continuously measured. A difference between the over-delivery target amount for the given unit product and the cumulative over-delivery amount for previous unit products is calculated. As shown in equation (1) below, the unit product over-delivery parameter (PO) is calculated as the difference between the last measurement of the product parameter (LW) and the product target parameter (TW).

$$PO = LW - TW \qquad (1)$$

The cumulative overfill or over-delivery amount for a number of products previously produced by the manufacturing process, or batch (BO), is calculated by summing a difference between the measurement for each product previously produced and the target parameter according to equation (2) below.

$$BO = \Sigma_1^N (LWn - TW) = \Sigma POn \qquad (2)$$

Where N is the cumulative number of unit products previously produced by the manufacturing process at the time of calculation, and n is current product index number for the unit product from which a measurement is made. For each unit n produced by the manufacturing process, the value of N is incremented by one unit.

Once the cumulative or batch over-delivery amount is determined, a net difference between the unit product over-delivery target parameter (OT) and the cumulative or batch over-delivery amount and is calculated as shown by the equation (3) below.

$$\text{Net Difference} = (OT - BO) \qquad (3)$$

A control limit adjustment (CLA) is then calculated according to equation (4) below.

$$CLA = (OT - BO)CLAM \qquad (4)$$

As will subsequently be described, the predetermined modifier CLAM in equation (4) can be determined though an iterative process. The particular value of CLAM can be specified as a percentage of the target value for the process. The control limit adjustment value is then added or subtracted from the upper and lower control limits CL, depending upon whether CLA is a positive or negative value, to change their values. For example, as shown in FIG. 2A, the upper and lower control limits (CL) are denoted as elements 18 and 20, respectively, are reduced in value by subtracting the CLA from each of the upper and lower limits. Conversely, for a positive value of the CLA, the upper and lower control limits are correspondingly increased by the CLA.

In accordance with an aspect of the invention, a computer system used to control the manufacturing process is equipped with a memory unit and a microprocessor unit. The memory unit has the capability of storing a number of parameters needed to perform the calculations used in the process control method of the invention. Further, the computer system is equipped with logic units, signal processing systems, and mechanical interfaces that enable the computer system to dynamically monitor and control the manufacturing process. For example, computer process control systems such as, an Allen Bradley PLC5 system available from Rockwell Automation, or an S5 or S7 control system available from Siemens, or the like, can be employed for operation and control of a manufacturing process using the process control method of the invention.

As will subsequently be described, the process control hardware and software employed by the inventive process control method can be housed in a measurement system, such as a weighing scale, a pH meter, a chemical detector, a moisture sensor, or other analytical device associated with the manufacturing process equipment. For example, in the case of weight measurement, any one of Yamato Models—Sigma F1, Alpha Series, Compact Series, Snack Series, Sigma Series, SDW Series, scales available from Yamato Corporation, Akashi, Japan can be used. These scales can be used to perform weight measurements and process control functions based on calculations according to the inventive method. Those skilled the art will appreciate that the particular detailed features of the computer control system will vary depending upon the operational characteristics of the manufacturing process.

Figure 3:
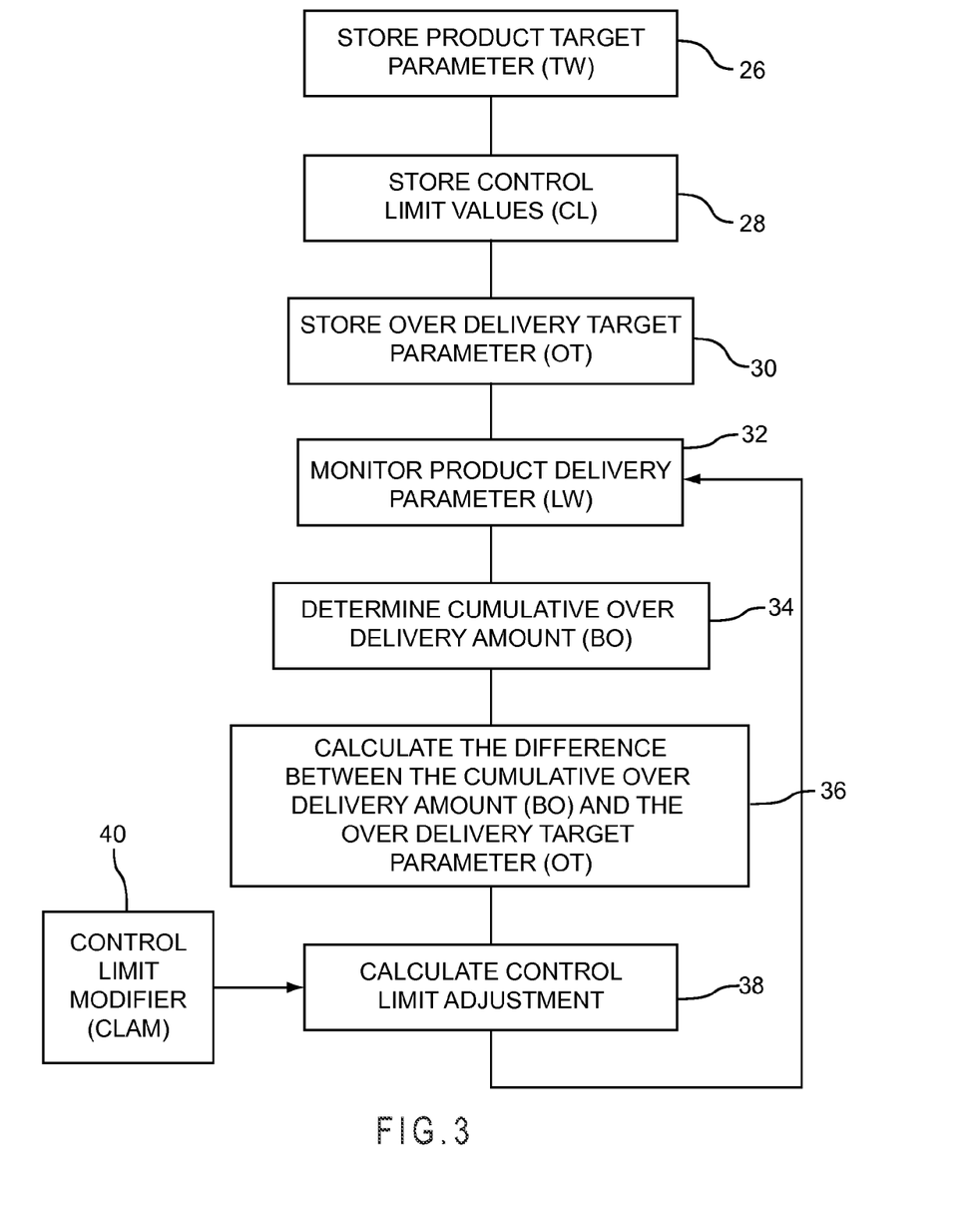
FIG. 3 illustrates a flow chart arranged in accordance with an aspect of the process control algorithm in accordance with an embodiment of the invention.

FIG. 3 illustrates a flow chart setting forth various elements of the control algorithm in accordance with an aspect of the invention. The process control algorithm illustrated in FIG. 3 is intended to be executed by the computer system coupled to the manufacturing process. In preparation to execute the control algorithm, a product target parameter (TW) is stored in step 26. Upper and lower control limit values (CL) for the product target parameter (TW) are stored in step 28. The product target parameter can be a measure of a physical or chemical characteristic of unit products, or preferably, a statistic, such as a running average of unit products for a predetermined number of unit products. The control limits can be set to trigger an alarm if the product control parameter goes above or below the control limits.

A unit product over-delivery target parameter (OT) is stored in step 30. The over-delivery target parameter represents an amount of manufactured product that is selected to provide a slight excess above the product target parameter (TW). By selecting a quantity in excess of the specified amount, the manufacturing process will operate with assurance that each unit products will at least satisfied the minimum requirements for weight, volume, moisture content, and the like. The process control methodology assumes that a slight excess of delivered product for each unit product is preferred to a slight under delivery. The methodology stems from the expectation that buyers of the unit products will be less concerned with overfill than with underfill of the unit products. Although the embodiments of the invention described herein relate to the goal of ensuring slight over delivery of unit products, those skilled in the art will appreciate that the control methodology described herein can readily be used to ensure a slight under delivery of unit products.

To actively control the manufacturing process, the process control system continuously monitors the product delivery parameter (LW) in step 32. As will be subsequently described in the various exemplary embodiments of the invention, continuous monitoring of unit products can be carried out by weight measurement of one unit product or a batch of unit products by a scale interfaced with the manufacturing process. Alternatively, different physical parameters can be monitored by devices, such as a moisture detecting device, a volumetric measuring device, a pH meter, a chemical analyzer, and the like. Using the continuously monitored product delivery parameter, a cumulative over-delivery amount for a number of unit products, such as a batch (BO) is determined in step 34 using equation (2). Where a predetermined number of unit products are specified as a batch, the batch over-delivery amount (BO) represents the amount of excess product delivered for a batch of unit products.

In accordance with accepted process control standards, the unit products are monitored to make sure that the product delivery parameter does not fall outside of customer requirements nor any governmental regulations for the particular product delivery parameter. If a unit product is determined to not meet one or both customer or government requirements, data for the particular unit product is not included in the process control calculations and the unit product is removed from the process line. The unit product is then reprocessed or discarded depending upon the type of product and the nature of the product composition.

Once the cumulative over-delivery amount (BO) is determined, the net difference between the over-delivery amount (BO) and the unit product over-delivery target parameter (OT) is determined in step 36 using equation (3). With the net difference determined, a control limit adjustment is calculated in step 38 using a previously-determined control limit modifier (CLAM) stored in location 40. As shown in equation (4), the control limit adjustment is determined by multiplying the net difference between the cumulative over-delivery amount and the over-delivery target parameter by the control limit modifier. The value of the control limit adjustment will be either positive or negative depending upon the relative magnitude of the over-delivery parameter and the over-delivery amount. As illustrated in FIG. 2A, the control limits 18 and 20 are adjusted by the value of the control limit adjustment (CLA). Where the control limit adjustment has a negative value, the upper and lower control limits 18 and 20 will be reduced in magnitude. Correspondingly, where the control limit adjustment is positive, the control limits 18 and 20 will be increased in magnitude.

Figure 2B:
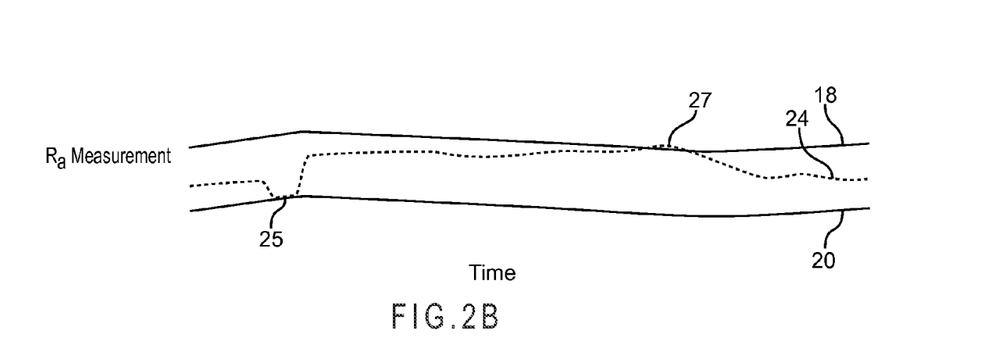

The execution of the steps illustrated in FIG. 3 operates to either raise or lower the control limits for the product delivery statistic 24. As shown in FIG. 2B, when the product delivery statistic 24 decreases to a value equal to or less than the lower control limit 20, denoted at inflection point 25, the program adjusts the upper and lower control limits downward by an amount determined by equation (4). Conversely, when the value of the product delivery statistic 24 increases to a value at or above the upper control limit 18, denoted at inflection point 27, the program adjusts the control limits downward by an amount determined by equation (4).

Notably, the process control method of the invention performs calculations based on product over-delivery to specify control limits for a product delivery statistic. In contrast to prior art methods, in the instant invention, a production parameter that differs from the direct measurement of a unit product parameter is used to control the manufacturing process. By using an over-delivery amount, rather than a measure of each individual unit product, such as unit weight or unit product volume, the process control method of the invention succeeds in limiting the amount of product over-delivery to a specified amount. Further, the process control method of the invention provides improved dynamic control of the manufacturing process.

In operation, a process parameter is adjusted as necessary to center the product delivery statistic 24 between the upper and lower control limits. For example, in a cheese casting process, the pump speed is increased at inflection point 25, and the product delivery statistic 24, in this case, a running average weight of sectioned cheese coming from the casting belt, increases in response to the increase in pump speed, which increases the flow rate of cheese onto the casting belt. An example, of a cheese casting process in illustrated in FIG. 5. Correspondingly, at inflection point 27, the pump speed is reduced, with the effect that the running average weight decreases toward the center of the control limit range.

In accordance with an aspect of the invention, the number of unit products that are monitored before making an additional change to the process parameter depends on the nature of the manufacturing process and the particular characteristics of the manufacturing equipment. Those skilled in the art will recognize that in some manufacturing processes, several unit products can be in transition between the point at which the process parameter has an effect on the product characteristics, such as weight, and the point at which the weight measurement is made. Accordingly, in the process control method of the invention, the number of unit products that are produced after changing the process parameter and before a further change in the process parameter is made, is specified according to the particular manufacturing process.

Figure 4:
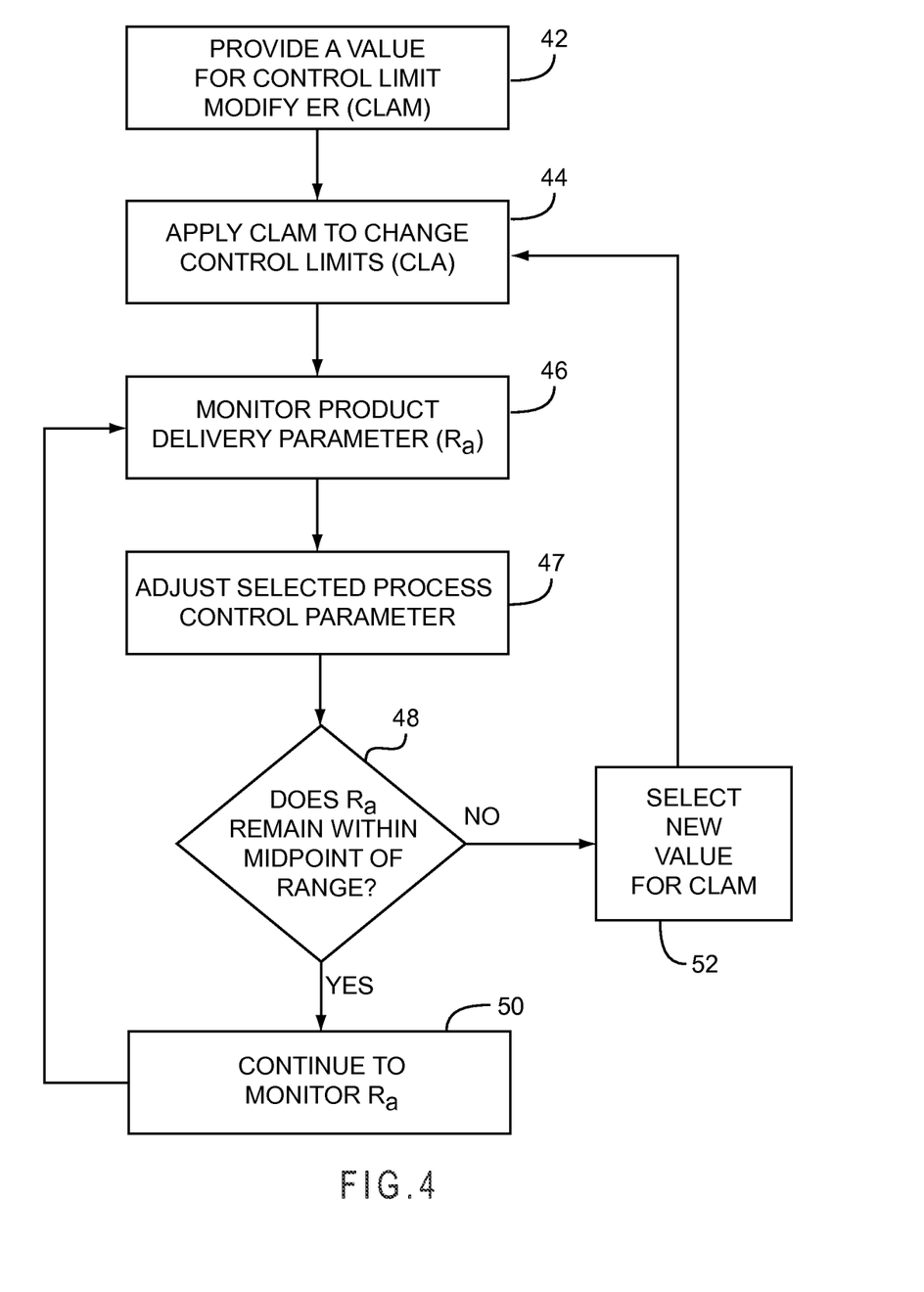
FIG. 4 illustrates a flow chart arranged in accordance with an aspect of the process control algorithm for determining a control limit modifier in accordance with an embodiment of the invention.

An exemplary embodiment of an iterative method for calculating the control limit modifier (CLAM) is illustrated in FIG. 4. The method begins by providing an initial value for the control limit modifier in step 42. The initial value is selected based on the operating characteristics of the manufacturing process, the physical and chemical properties of the manufactured product, and the like. Those skilled in the art will appreciate that different manufacturing processes have different response characteristics when changes are made to various control aspects of the process. For example, some manufacturing processes show high sensitivity to small changes in operating parameters, while other manufacturing processes are somewhat insensitive to changes in certain operating parameters. For example, in a cheese casting process, the pump speed through which the cheese is introduced onto a constant speed casting belt is a key process control parameter that affects the weight of unit products. Through standard response multivariate statistical analysis, key control parameters can be determined for virtually any manufacturing process. Accordingly, the sensitivity of the manufacturing process to changes in the control parameter can be taken into consideration when selecting an initial value for the control limit modifier.

In step 44 an initial value for the control limit modifier (CLAM) is applied to adjust the control limits (CLA) in accordance with equation (4). After determining adjusted control limits and resetting the control limits according to the adjustment value, the product delivery parameter (Ra) is monitored in step 46.

The product delivery parameter is monitored for a predetermined time. During the monitoring time period, any excursions of the product delivery parameter above or below the adjusted control limits are noted and, in step 47, a selected process control parameter is adjusted. For example, in a cheese casting process, the pump speed is increased or decreased depending upon whether the process is exceeding the upper control limit or falling below the lower control limit.

The product delivery parameter is again monitored and the value is evaluated at step 48. If the product delivery parameter remains within the adjusted control limit, and preferably at a level that is intermediate to both the upper control limit and the lower control limit, the system continues to monitor the product delivery parameter at step 50 and control returns to step 46 for continuous monitoring. Alternatively, if the product delivery parameter does not remain within the adjusted control limits, a new value for the control limit modifier is selected at step 52. In accordance with one aspect of the invention, the initial control limit modifier is reduced or increased depending upon whether the excursion of the product delivery parameter was above the upper control limit or below the lower control limit.

To provide values for the control limit modifier (CLAM), for example, the control limit modifier can be specified as a fractional amount of the unit product over-delivery target parameter (OT). In one method, the control limit modifier is a fixed percentage of the over-delivery target parameter, such as 1% to 10% of the over-delivery target parameter. Depending on the sensitivity of the process to changes in control factors, the control limit modifier can be a fraction of a percent up to 20% or more of the over-delivery target parameter.

In a similar manner to determining the value of CLAM set forth above, the maximum amount by which the process control limits can be adjusted at any one point in time is specified. An iterative method can be used in which a process is monitored and control limit adjustments are applied, as described above. Those skilled in the art will appreciate that the amount the control limits can be adjusted should be limited in order to maintain the product content within the specified limits, as set forth by government regulations or by customer specifications. In order to determine the maximum limit for the CLA, the iterative method can be applied to set a Control Limit Adjustment Limit (CLAL) at a small percentage of, for example, the maximum allowable variation (MAV) for the particular product delivery parameter as set forth by government regulations. After monitoring the process and observing that the unit products meet all specifications and requirements, the CLAL could be increased. Correspondingly, if the product delivery statistic Ra begins to wander outside of the MAV, the CLAL can be decreased. Upon completion of the iterative process, the CLAL is typically stored and not changed for a given process.

An exemplary computer executable code for performing the process control algorithm described above for a cheese casting process is listed in the Appendix at the end of the specification. The code is set forth in RSLogix™ 5 programming language by Rockwell Automation. An exemplary cheese casting process is described below.

The following illustrative examples describe the application of the process control methodology of the invention to various kinds of manufacturing processes. Each of the described processes is schematically illustrated and only shows a small portion of a manufacturing process system. Those skilled in the art will understand that each of the illustrated manufacturing processes include a large number of operating systems and sub-systems, various product handling units, numerous product sizing and packaging systems, and the like. For purposes of illustration, only selected portions of the manufacturing processes that interface with process control equipment are illustrated. Further, the product illustrated in the examples is typically a food product, such as imitation or processed cheese, or another food product such as a dairy product, and the like. Those skilled in the art will also recognize that other types of materials can benefit from the process control method of the invention. For example, various materials such as bulk materials, chemical compositions, liquids, and the like, are representative products.

Figure 5:
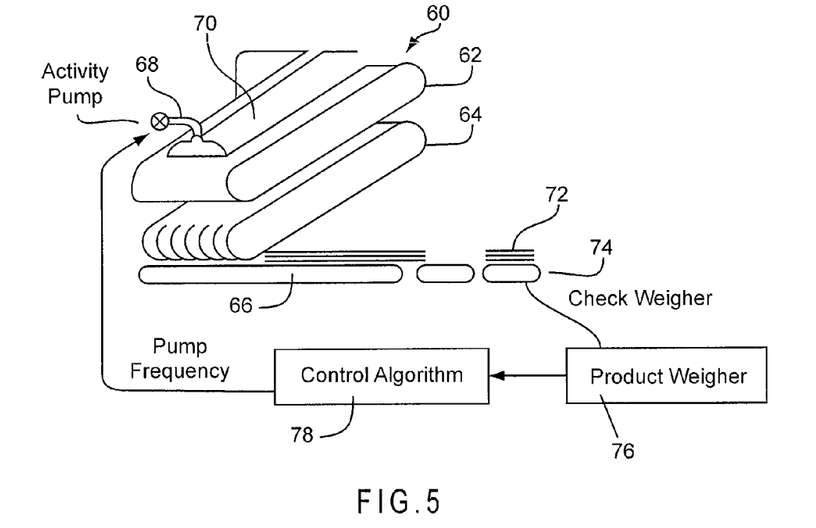
FIG. 5 illustrates a casting process system incorporating the process control method in accordance with an embodiment of the invention.

FIG. 5 illustrates a casting process incorporating the process control method described above. A casting unit 60 includes a pair of opposing casting belts 62 and 64. Casting belt 64 feeds a conveyor 66. A metering pump 68 produces a flow of cheese product 70 onto casting belt 62. The cheese product is divided into ribbons prior to transfer to conveyor 66. As the ribbons of cheese product are transferred along conveyor 66, they are stacked and laterally cut into stacks 72. Each stack is weighed by a scale 74 that is electronically coupled to a weighing unit 76. Weighing unit 76 transmits weight information for each stack of cheese slices to a computer control system 78. Control system 78 executes the process control algorithm described above.

Those skilled in the art will appreciate that weighing unit 76 and computer control system 78 can be integrated together in a single system that performs all of the product measurement and process control functions. In accordance with an aspect of the invention, all of the hardware and software used to carry out the inventive process control method can be housed in a single unit. This single unit can be interfaced with the manufacturing equipment to adjust process parameters of the manufacturing process based on continuous measurement of manufactured products.

In the casting process of FIG. 5, the process operator enters a value for the unit product over-delivery target parameter (OT) and the product target weight (TW) for each cheese stack into control system 78. The control limits (CL) are previously stored in the control system. The control limits are modified as necessary according to the process control algorithm, and the computer system 78 maintains a running average (Ra) of the measure stack weights by regulating the amount of cheese product being pumped onto casting belt 62. In accordance with the method described above, control system 78 executes the algorithm described above. Accordingly, the casting process is controlled based on the cumulative over-fill or batch weight (BO) of the cheese slices in stacks 72.

Figure 6:
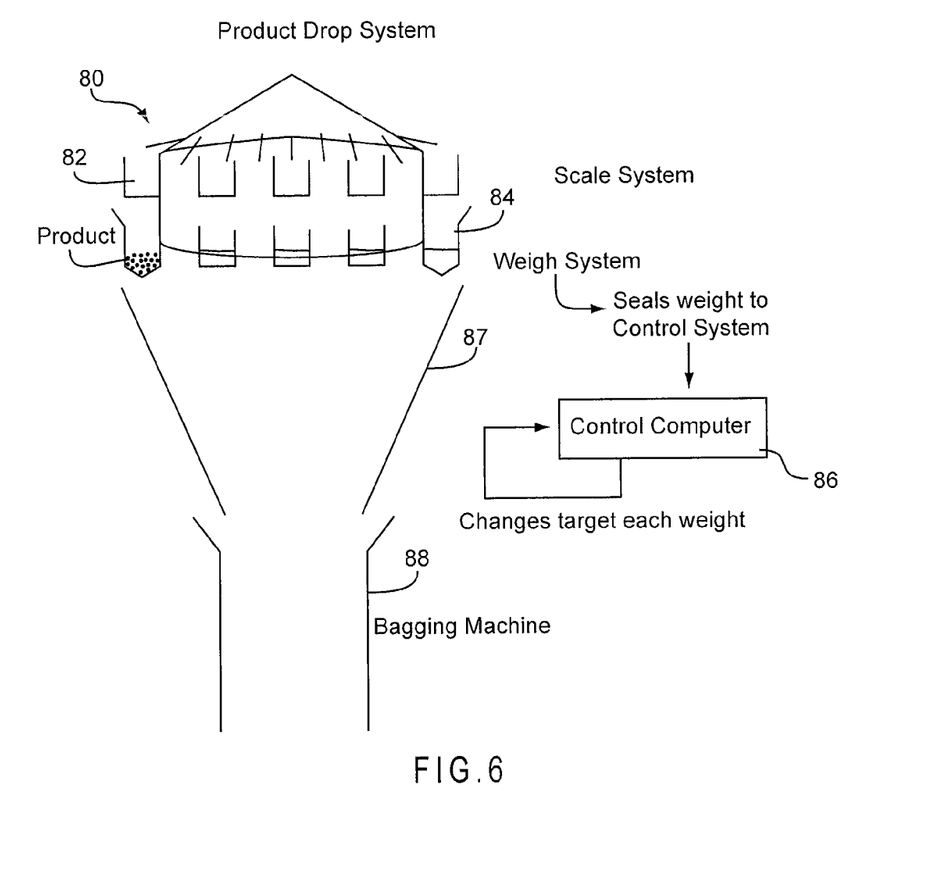
FIG. 6 illustrates an intermittent product drop process system incorporating the process control method in accordance with an embodiment of the invention.

FIG. 6 illustrates an intermittent product drop process incorporating the process control method described above. A product drop system 80 includes product receiving the bins 82 in which an amount of solid product is introduced. The receiving bins can be arrayed next to each other to form linear displacement of the bins, or alternatively, the bins can be arranged on a rotational platform and sequentially loaded with product as the platform rotates. A weighing system 84 measures the weight of the product contained within a predetermined number of bins. Weighing system 84 is electronically coupled to a process control computer 86. Once the bins are filled and weighed, the product in each bin is dropped into a chute 87 that funnels the combined product from the bins into a bagging machine 88. The bagging machine ultimately seals the product dropped from the bins 82 into individual packages of product.

In operation, the product drop process is controlled by process control computer 86 that regulates the amount of product delivered into bins 82. The system operator enters a target value for packaged product weight (TW) and a unit product over-delivery weight (OT) into computer control system 86. The control limits (CL) are previously stored in the control system. The control limits are modified as necessary according to the process control algorithm, and the computer system 86 maintains a running average (Ra) of total weight from a predetermined number of bins or number of fill cycles. In accordance with the method described above, control system 86 executes the algorithm described above to control the amount of product delivered to bins 82 based on the cumulative amount of over-delivery of product into bins 82.

Figure 7:
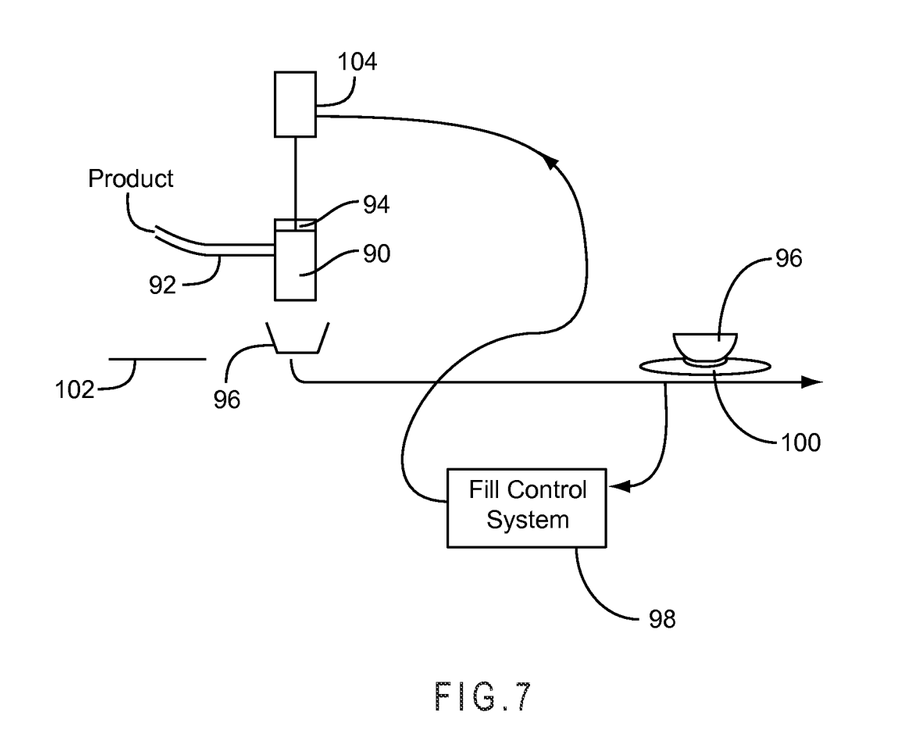
FIG. 7 illustrates a fill process system incorporating the process control method in accordance with an embodiment of the invention.

FIG. 7 illustrates a fill process incorporating the process control method in accordance with the process control method described above. A chamber 90 is supplied with a product, such as a liquid food product, through a supply tube 92. A piston 94 applies force to the product in chamber 90, which causes an amount of the product to be ejected from the bottom of chamber 90 and into a receptacle 96. A computer control system 98 receives weight information from a scale 100 that weighs receptacle 96 upon transport from the fill location to scale 100 by a conveyor system 102. Based on the measured weight of individual receptacles 96, or a predetermined number of receptacles 96, computer control system 98 regulates the pressure applied by piston 94 to the product in chamber 90. By regulating the force applied by piston 94, the amount of product to be ejected from chamber 90 into receptacles 96 can be controlled by computer control system 98.

Those skilled in the art will appreciate that different mechanical systems can be used to operate a piston 94. For example, piston 94 can be operated by a drive unit 104, which can be an electro-mechanical servo system, or a pneumatic cylinder drive system, or the like. Further, instead of a piston applying force to the product in changer chamber 90, drive unit 104 can be used.

In operation, the system operator enters a target value for the target weight (TW) of product transferred to the receptacles and a unit product over-delivery target weight (OT) into computer control system 98. The control limits (CL) are stored in the computer control system. The control limits are modified as necessary according to the process control algorithm, and the computer control system 98 maintains a running average (Ra) of the total weight from a predetermined number of receptacles. In accordance with the method described above, control system 98 executes the algorithm described above to control the amount of product delivered to receptacles 96 based on the amount of over-delivery of product into receptacles 96.

Figure 8:
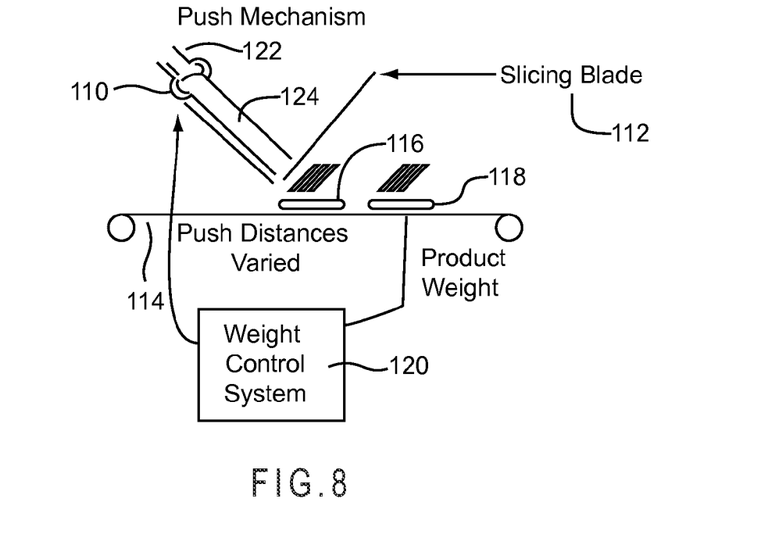
FIG. 8 illustrates a product slicing system incorporating the process control method in accordance with an embodiment of the invention.

FIG. 8 illustrates a product slicing system for carrying out a slicing process incorporating the process control method described above. The system includes a product feed system 110 that propels product through a slicing system 112 and a conveyor system 114 that transfers receptacles 116 past a receiving station below slicing system 112. Upon receiving a predetermined number of slices, conveyor system 114 transfers the loaded receptacle to a scale 118. Scale 118 is electronically coupled to a computer control system 120. Computer control system 120 regulates a mechanical drive system 122 that propels product through slicing system 112.

Those skilled in the art will appreciate that various types of mechanical drive systems and slicing systems can be used to continuously slice product transported through feed system 110. For example, various types of push mechanisms can be used to apply force to the distal end of a block of product 124. Further, slicing system 112 can be configured to cut blocks of material from product 124 in larger sections than the slices illustrated in FIG. 8. For example, slicing system 112 can be a guillotine blade operated by a servo-driven control mechanism that cuts large chunks of product, which are positioned onto receptacles 116.

In operation, the system operator enters a target value for the target weight (TW) of the product slices collected on receptacles 116 and an over-delivery target weight (OT). The control limits (CL) are stored in the computer control system. The control limits are modified as necessary according to the process control algorithm, and the computer control system 120 maintains a running average (Ra) of the total weight from a predetermined number of receptacles. In accordance with the method described above, computer control system 120 executes the algorithm described above to control the amount of product delivered to receptacles 116 based on the amount of over-delivery of product into the receptacles.

Figure 9:
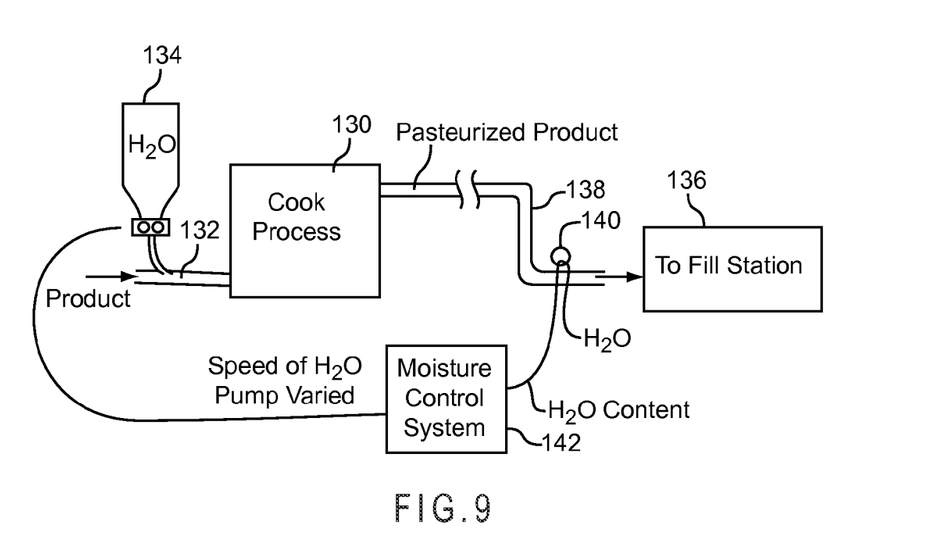
FIG. 9 illustrates a cooking process system incorporating the process control method in accordance with an embodiment of the invention.

FIG. 9 illustrates system for carrying out a cooking process incorporating the process control method described above. The cooking system includes a cooker 130 that receives hydrated product through an input two 132. The product transferring through input two 132 is hydrated by a hydration system 134 couple to input tube 132. Upon completion of the cooking process, the cooked product is transferred to a fill station 136 through an outlet tube 138 coupled to cooker 130. A hydration monitor 140 measures the degree of hydration of the cooked product as the product is transferred to fill station 136. A computer control system 142 receives hydration information from hydration monitor 140 and regulates the amount of water introduced into the product by hydration system 134.

In operation, the system operator enters a target value for the target hydration (TW) of the cooked product and a value for the unit product minimal hydration level (OT). The control limits (CL) are stored in the computer control system. The control limits are modified as necessary according to the process control algorithm, and the computer control system 142 maintains a running average (Ra) of the hydration level of the cooked product. In accordance with a variant of the method described above, computer control system 142 executes the algorithm described above to control the hydration level of the cooked product delivered to fill station 136 based on the amount of a under-hydration of the product exiting cooker 130. The computer control system will calculate the quantity of product and the percentage of moisture and solids in the product. The computer control system will add moisture to the product to maintain a constant batch moisture content that is less than a maximum amount. In this way, the total moisture is always below a specified level in the cooked product and excess moisture content of the cooked product is avoided.

Figure 10:
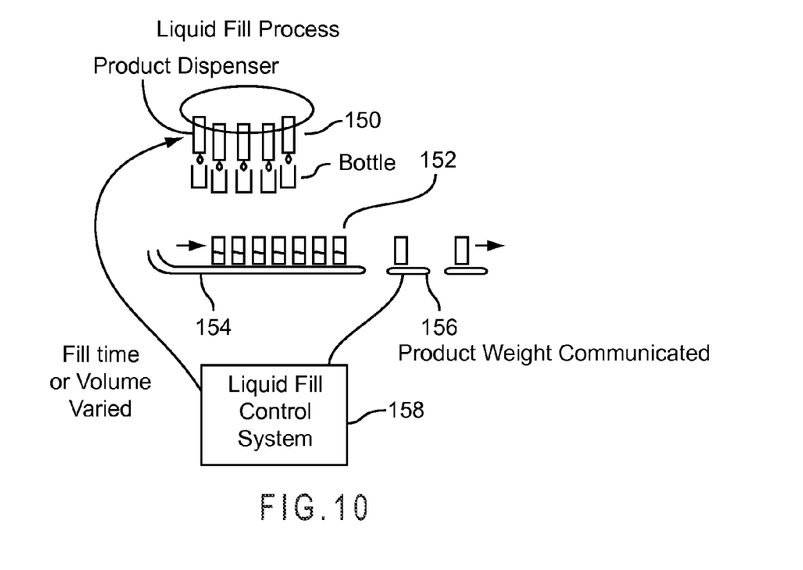
FIG. 10 illustrates a liquid fill process system incorporating the process control method in accordance with an embodiment of the invention.

FIG. 10 illustrates a liquid fill system for carrying out a bottling process incorporating the process control method in accordance with the process control method described above. A rotating dispenser 150 supplies a liquid food product to bottles 152 arrayed on a conveyor device 154. The conveyor 154 transports the filled bottles to a scale 156, where the bottles are weighed. A computer control system 158 receives weight information from a scale 156. Based on the measured weight of individual filled bottles 152, or a predetermined number of bottles, computer control system 158 regulates the amount of liquid delivered to each bottle by dispenser 150. By regulating the fill time or the volume of liquid from dispenser 150, the amount of liquid dispensed into each bottle, as measured by the weight of each bottle, can be controlled by computer control system 158.

In operation, the system operator enters a target value for the target weight (TW) of liquid dispensed into the bottles and an over-delivery target weight (OT) into computer control system 158. The control limits (CL) are stored in the computer control system. The control limits are modified as necessary according to the process control algorithm, and the computer control system 158 maintains a running average (Ra) of the total weight from a predetermined number of bottles, such as a case of bottles. In accordance with the method described above, control system 158 executes the algorithm described above to control the amount of liquid delivered into bottles 152 based on the amount of over-delivery of liquid into bottles 152.

Figure 11:
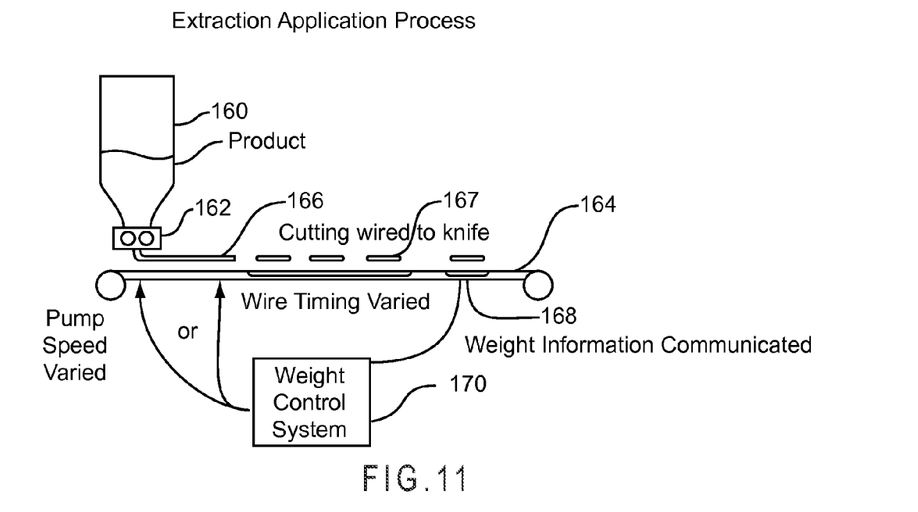
FIG. 11 illustrates an extruding system that incorporates the process control method in accordance with an embodiment of the invention.

FIG. 11 illustrates a system and method for extruding a product that incorporates the process control method described above. The extrusion system includes a tank 160 that contains a product, such as liquefied cheese, imitation cheese, an emulsified food product, and the like. The product is extruded through a regulation system 162 to a conveyor belt 164. A cutting system 166 includes a blade that cuts the extruded product into product sections 167. The product sections are transferred by conveyor belt 164 to a scale 168. Scale 168 is electrically coupled to a computer control system 170. Computer control system 170 regulates the amount of extruded product by controlling regulation system 162. In addition to controlling regulation system 162, computer control system 170 can alternatively, or in addition, control the speed of conveyor belt 168 as the belt passes under regulation system 162. Further, computer control system 170 can also regulate the cutting activity of cutting system 166 to vary the lateral dimensions of the food product sections transported to scale 168.

In the extrusion process of FIG. 11, the process operator enters a value for the unit product over-delivery target (OT) and the product target weight (TW) for each product section. The control limits (CL) are previously stored in the control system. The control limits are modified as necessary according to the process control algorithm, and the computer control system 170 maintains a running average (Ra) of the measure product section weights by regulating the amount of product being extruded onto the conveyor belt. In accordance with the method described above, computer control system 170 executes the algorithm described above. Accordingly, the extrusion process is controlled based on the excess cumulative or batch weight (BO) of one or a group of the product sections 167.

Figure 12:
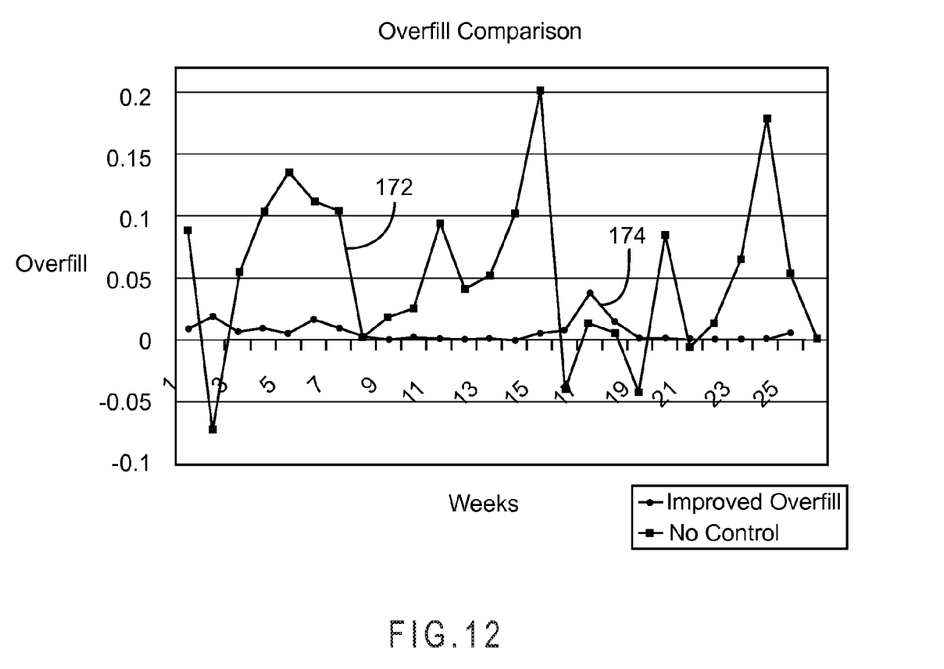
FIG. 12 illustrates a comparative plot of overfill control for a process incorporating the process control method in accordance with an embodiment of the invention versus a control process in accordance with the prior art.

In a non-limiting example, the improved process control realized by a food manufacturing process incorporating the process control method of the invention is illustrated in FIG.

12. The comparative plot shows product overfill versus time in weeks for batches of cheese product produce by a cheese casting process similar to that illustrated in FIG. 5. Line 172 shows the overfill amount measured for cartons of cheese produced by a casting process regulated in accordance with a process control system of the prior art. Line 174 shows the overfill amount measured from cartons of cheese product produced by the casting process using the process control method in accordance with the instant invention. As is readily apparent from the plot, greatly improved overfill control is maintained by the operation of the casting process under the process control method described above. By controlling the casting process using the process control method of the invention, the large variance and overfill realized by the prior art method can be greatly reduced. The improved access control realized by practice of the present invention improves the efficiency of the manufacturing process and reduces costs associated with excessive overfill. Further, the amount of underfill is also substantially reduced by the inventor process control method. By substantially eliminating product underfill, increase consistency in meeting the expectations of buyers of the cheese product is satisfied.

Thus, it is apparent that there has been described, in accordance with the invention, a method for dynamically controlling a manufacturing process using product overfill that fully meets the advantages set forth above. Although the invention has been described and illustrated with reference to specific illustrative embodiments thereof, is not intended that the invention be limited to those illustrative embodiments. Those skilled in the art would recognize that variations and modifications can be made without departing from the spirit of the invention. For example, numerous different specialized electronic sensing and control systems can be used to perform the process control method, such as programmable logic controllers, electronic sensors, intelligent interactive sensing devices, and the like. It is therefore intended to include within the invention all sets of variations and modifications as fall within the scope of the appended claims and equivalents thereof.

APPENDIX

Computer Executable Code

```
LIM N51:94 N51:55 N51:95 BST CPT N51:90 (N51:90+
N51:55)–N51:80 NXB
COP #N51:81 #N51:80 9 NXB MOV N51:55 N51:89 NXB
OTE N51:96/9 BND
XIC N51:96/9 BST CPT F8:190 ((N51:55–2268.0)|453.6)+
F8:190 NXB
CPT F8:170 ((F8:190*453.6)|F8:185)+2268.0 BND
CPT F8:191 (N51:70–F8:190)*F8:195
BST LES F8:191–10.0 MOV –10.0 F8:191 NXB GRT
F8:191 10.0
MOV 10.0 F8:191 BND
CPT F8:192 ((N51:52+F8:191)*10.0)|N51:90
GRT N51:90 N51:93 XIC N51:96/9 XIC B3/1376 XIO N51:
96/10
ONS B3/1361 BST MOV F8:192 F8:100 NXB LES F8:100
0.9975
MOV 0.9975 F8:100 NXB CLR N51:99 NXB OTE B3/1377
BND
LES N51:90 N51:92 XIC B3/1376 XIC N51:96/9 XIO N51:
96/10
ONS B3/1362 BST MOV F8:192 F8:100 NXB GRT F8:100
1.003
MOV 1.003 F8:100 NXB CLR N51:99 NXB OTE B3/1378
BND
BST XIC B3/1377 NXB XIC B3/1378 BND ONS B3/1379
XIC N51:96/8 OTL B3/54
BST XIC B3/1377 NXB XIC B3/1378 BND ONS B3/1379
XIC N51:96/8 BST
CPT F8:50 F8:50*F8:100 NXB OTL B3/54 BND
BST BST ADD N51:99 1 N51:99 NXB
CPT N51:93 ((N51:52*10.0)+100.0)+(F8:191*10.0) NXB
CPT N51:92 ((N51:52*10.0)–100.0)+(F8:191*10.0) BND
NXB
GRT N51:99 N51:79 BST OTU N51:96/5 NXB OTU N51:
96/4 NXB
OTU N51:96/10 NXB OTE B3/1376 BND BND
```

Variable Descriptions

N51:55—Last Weight
N51:90—Running average of 10 products
N51:92—Lower Control Limit
N51:93—Upper Control Limit
N51:94—High Moving Average
N51:95—Low Moving Average
F8:190—Batch Overfill
F8:191—Control Limit Adjustment
F8:192—Adjustment percentage
F8:50—Pump speed
F8:100—Percent pump adjustment
F8:170—Batch Average
N51:70—Overfill Target
F8:195—Control Limit Adjustment Modifier
B3/1376—No weight change coming
N51:99—# of product since last weight change
N51:96/8—Auto weight control enabled
N51:96/9—Weight within limits
N51:96/10—Manual change coming

The invention claimed is:

1. A method for controlling an output of a computerized manufacturing process, the method comprising:
   storing a product target parameter (TW) for a unit process in a computer memory of a computer system associated with manufacturing process equipment;
   storing control limit values (CL) in the computer memory for a product delivery statistic (Ra) of the product target parameter (TW);
   storing a unit product over-delivery target parameter (OT);
   monitoring a unit product delivery parameter (LW) for the unit process and continually storing values in the computer memory for the product delivery parameter and a sequence number of unit products produced;
   calculating a unit product over-delivery parameter (PO) by determining the difference between the unit product delivery parameter (LW) and the product target parameter (TW);
   determining a cumulative over-delivery amount (BO) for a number of previously produced unit products in a processor of the computer system up to a current sequence number;
   determining a net difference between the unit product over-delivery target parameter (OT) and the cumulative over-delivery amount (BO) in the processor of the computer system;
   providing a predetermined modifier (CLAM) that represents a fractional amount of the unit product over-delivery target parameter (OT) and adjusting the net difference by the predetermined modifier to obtain a control limit adjustment (CLA); and adjusting the control limit values (CL) by the control limit adjustment (CLA) to obtain adjusted control limits and processing additional unit products through the unit process using the adjusted control limits.

2. The method of claim 1, wherein monitoring a product delivery parameter comprises monitoring at least one of a product unit weight, a product unit volume, or a product unit moisture content.

3. The method of claim 1, wherein determining the cumulative over-delivery amount (BO) comprises summing a difference between the product delivery parameter (LW) for a number of previously produced unit products and the product target parameter (TW).

4. The method of claim 1, wherein adjusting the difference by a predetermined modifier (CLAM) comprises multiplying the difference by the predetermined modifier (CLAM).

5. The method of claim 1, wherein providing a predetermined modifier (CLAM) comprises:
   a) selecting a value for the predetermined modifier (CLAM);
   b) applying the value to change the control limit values (CL) to provide adjusted control limits;
   c) observing changes in the product delivery statistic (Ra) relative to the adjusted control limits for a predetermined time period, if the product delivery statistic (Ra) moves outside of the adjusted control limits, selecting a new value for the predetermined modifier (CLAM); and
   d) repeating steps b) and c) until the product delivery statistic (Ra) stays within the adjusted control limits for the predetermined time period.

6. The method of claim 1, wherein the computerized manufacturing process comprises a food product slice process, and wherein storing a product target parameter (TW) comprises storing a weight of a predetermined number of slices, and monitoring a product delivery parameter (LW) comprises determining the weight of the predetermined number of slices and communicating the weight to the computer system.

7. The method of claim 6, further comprising regulating a pressure delivery of a food product to a casting belt to maintain the cumulative over-delivery parameter (BO) within the adjusted control limits.

8. The method of claim 6, further comprising regulating a push distance of a block of food product in the slice process to maintain the cumulative over-delivery parameter (BO) within the adjusted control limits.

9. The method of claim 6, further comprising regulating a pressure delivery of food product in an extruder to maintain the cumulative over-delivery parameter (BO) within the adjusted control limits.

10. The method of claim 1, wherein the computerized manufacturing process comprises a food product container filling process, and wherein storing a product target parameter (TW) comprises storing a weight of a predetermined number of food product portions, and monitoring a product delivery parameter (LW) comprises determining the weight of the predetermined number of food product portions and communicating the weight to the computer system.

11. The method of claim 10, further comprising regulating the delivery of food product portions to staging units in a bagging drop system to maintain the cumulative over-delivery parameter (BO) within the adjusted control limits.

12. The method of claim 10, further comprising regulating the delivery of food product portions to volumetric staging units in a piston chamber to maintain the cumulative over-delivery parameter (BO) within the adjusted control limits.

13. The method of claim 10, further comprising regulating the delivery of food product portions to volumetric staging units in auger chamber to maintain the cumulative over-delivery parameter (BO) within the adjusted control limits.

14. The method of claim 10, further comprising regulating the delivery of liquid food product portions to volumetric staging units in a bottling process to maintain the cumulative over-delivery parameter (BO) within the adjusted control limits.

15. The method of claim 1, wherein the computerized manufacturing process comprises a cooking process, and wherein storing a product target parameter (TW) comprises storing a value for moisture content of a predetermined number of cooked food product portions, and monitoring a product delivery parameter (LW) comprises determining the moisture content of the predetermined number of food product portions and communicating the moisture content to the computer system.

16. A method for controlling an output of a computerized manufacturing process, the method comprising:
   storing a product target parameter (TW) for a unit process in a computer memory of a computer system associated with manufacturing process equipment;
   storing control limit values (CL) in the computer memory for a product delivery statistic (Ra) of the product target parameter (TW);
   storing a unit product over-delivery target parameter (OT);
   monitoring a product delivery parameter (LW) for the unit process and continually storing values in the computer memory for the product delivery parameter and a sequence number of unit products produced;
   determining a cumulative over-delivery amount (BO) in the processor of the computer system by summing the difference between the product delivery parameter (LW) and the product target parameter (TW) for a number of product units previously produced up to a current sequence number;
   determining a net difference between the cumulative over-delivery amount (BO) and the unit product over-delivery target parameter (OT) in a processor of the computer system;
   providing a predetermined modifier (CLAM) that represents a fractional amount of the unit product over-delivery target parameter (OT) and adjusting the net difference by the predetermined modifier to obtain a control limit adjustment (CLA);
   adjusting the control limit values (CL) by the control limit adjustment (CLA) to obtain adjusted control limits; and
   using the computer to regulate product delivery to a staging system within the manufacturing process, so as to maintain the product delivery statistic (Ra) within the adjusted control limits for the unit process.

17. The method of claim 16, wherein monitoring a product delivery parameter comprises monitoring at least one of a product unit weight, a product unit volume, a product unit moisture content, a product unit pH value, or product unit chemical concentration.

18. The method of claim 16, wherein providing a predetermined modifier (CLAM) comprises:
   a) selecting a value for the predetermined modifier (CLAM);
   b) applying the value to change the control limit values (CL) to provide the adjusted control limits;
   c) observing changes in the product delivery statistic (Ra) relative to the adjusted control limits for a predetermined time period, if the product delivery statistic (Ra) moves outside of the adjusted control limits, selecting a new value for the predetermined modifier (CLAM); and d) repeating steps b) and c) until the product delivery statistic (Ra) stays within the adjusted control limits for the predetermined time period.

19. A method for controlling a continuous manufacturing process comprising:
   determining a cumulative over-delivery amount by summing a difference between a measured parameter for a number of previously produced unit products from a unit process and a target parameter for the unit process;
   determining a net difference between a target over-delivery amount and the cumulative over-delivery amount; and
   adjusting process control limits (CL) for a product delivery statistic of the unit products by providing a predetermined modifier (CLAM) that represents a fractional amount of the target over-delivery amount and multiplying the net difference by the predetermined modifier (CLAM) to obtain adjusted control limits for the unit process.

20. The method of claim 19 further comprising regulating product delivery to a staging system within the manufacturing process, so as to maintain the product delivery statistic within the adjusted control limits.

21. The method of claim 19, wherein providing a predetermined modifier comprises:
   a) selecting a value for the predetermined modifier (CLAM);
   b) applying the value to change the process control limits (CL) to provide the adjusted control limits;
   c) observing changes in the product delivery statistic (Ra) relative to the adjusted control limits for a predetermined time period, if the product delivery statistic (Ra) moves outside of the adjusted control limits, selecting a new value for the predetermined modifier (CLAM); and
   d) repeating steps b) and c) until the product delivery statistic (Ra) stays within the adjusted control limits for the predetermined time period.

22. The method of claim 19, wherein summing a difference between a number of previously produced unit products and the target parameter comprises monitoring a sequence number for the unit products produced and summing the difference up to a current sequence number.

* * * * *